Feb. 17, 1925.
C. J. McLAREN
1,526,604
ROTARY DRILLING APPARATUS
Filed Feb. 10, 1923
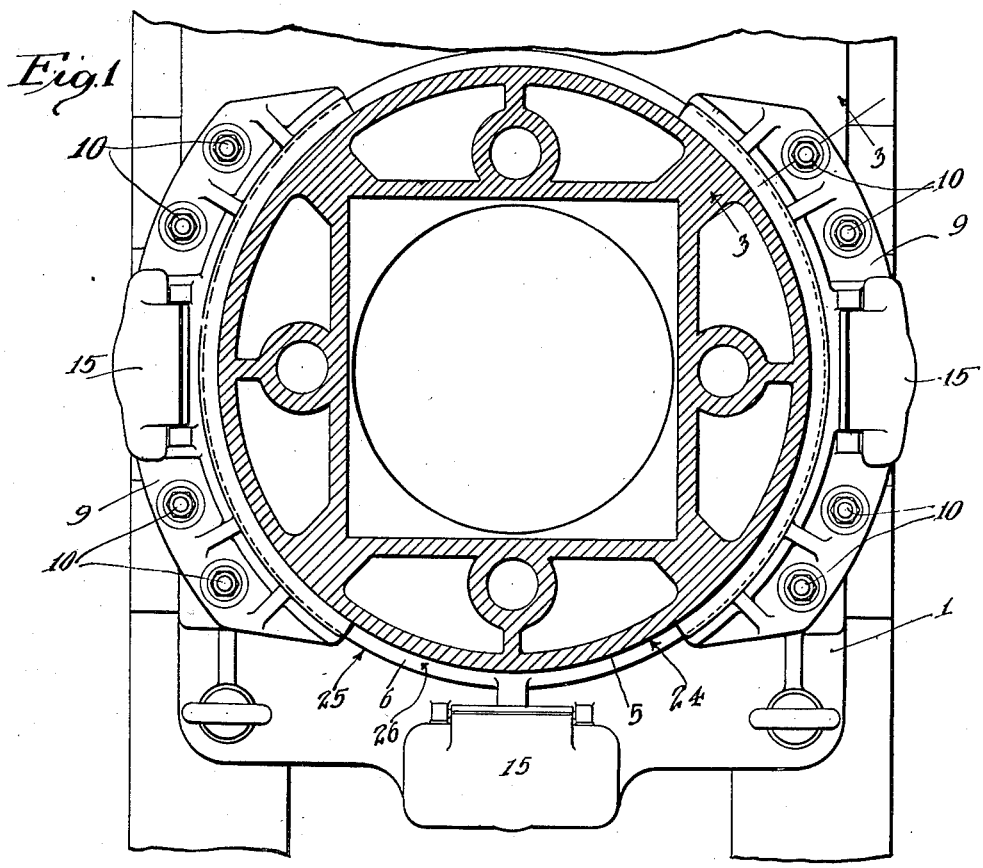
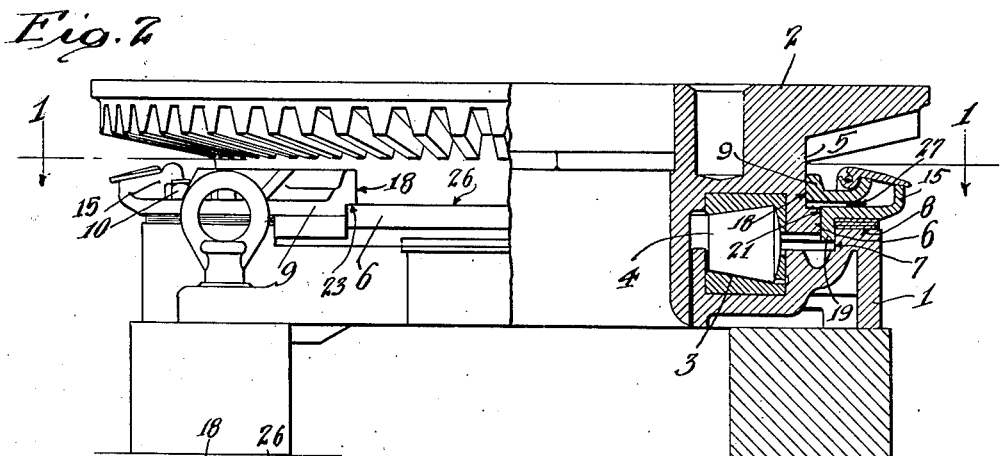
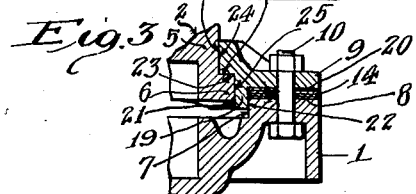
Inventor
Charles J. McLaren
By Lyon & Lyon attys Patented Feb. 17, 1925.

1,526,604

UNITED STATES PATENT OFFICE.

CHARLES J. McLAREN, OF REDONDO BEACH, CALIFORNIA, ASSIGNOR TO UNION TOOL COMPANY, OF TORRANCE, CALIFORNIA, A CORPORATION OF CALIFORNIA.

ROTARY-DRILLING APPARATUS.

Application filed February 10, 1923. Serial No. 618,291.

*To all whom it may concern:*

Be it known that I, CHARLES J. McLAREN, a citizen of the United States, residing at Redondo Beach, in the county of Los Angeles and State of California, have invented a new and useful Rotary-Drilling Apparatus, of which the following is a specification.

This invention relates to improvements in rotary drilling apparatus of the type employed in the drilling of oil wells and the like.

Rotary drilling apparatus of the type to which this invention relates has heretofore included generally a rotary table revolvable upon a base. The rotary table has been provided with a peripheral channel, and hold-down thrust brackets have been mounted on the base to cooperate with this peripheral channel and to prevent vertical displacement of the table on the base, and to generally act as a bearing or guide to maintain the rotary table axially aligned upon the base. In these former devices, the hold-down thrust brackets are customarily secured to the base by means of bolts or the like, and the lateral thrusts in the apparatus are resisted solely by these bolts. In operation of such an apparatus, the strains of the drilling produce extreme lateral thrusts, causing the rotary table to vibrate and shift. As a consequence, the hold-down thrust brackets would be displaced, and the bolts holding the same on the base would be loosened, necessitating frequent adjustment and consequent inadequate axial alignment of the table on the base.

The general object of this invention is to provide in an apparatus of the character above described, means for insuring true axial alignment of the table on the base, and to insure that the lateral thrusts of the table will be withstood without displacement of the table or hold-down thrust brackets. In general, this is accomplished by forming the hold-down thrust brackets with a depending member so shaped that it will be positioned between the rotary table and the base. This member is provided with inner and outer faces concentric to the axis of rotation of the device, and these concentric faces are complementary to corresponding faces on the rotary table and base, respectively. By means of this arrangement, the rotary table is automatically aligned within the apparatus, and the strains due to the lateral thrusts and vibrations set up by the rapidly revolving table and drill string are resisted and absorbed by the concentric bore of the base. In this manner, the means which secure the hold-down brackets to the base are relieved of all lateral thrust, and the tendency of the brackets to be laterally displaced, is eliminated.

A further advantage of the arrangement provided by this invention is that the various bearing faces of the rotary table, the base and hold-down thrust brackets, respectively, may be machined at one setting of each respective part, thereby assuring accuracy in alignment and economy in cost of manufacture.

Other objects and advantages of this invention will appear from the description hereinafter set forth, wherein there is described a specific embodiment incorporating such invention. It is intended that this specific embodiment be by way of illustration only, and the invention is not limited thereto, but is of the scope set forth in the appended claims. In the accompanying drawings, Fig. 1 is a horizontal section through the rotary drilling apparatus taken on a line illustrated by 1—1 in Fig. 2.

Fig. 2 is a side elevation partially in section of the rotary drilling apparatus illustrated in Fig. 1.

Fig. 3 is a fragmentary vertical section on a line 3—3 in Fig. 1 passing through the axis of one of the hold-down thrust bracket bolts.

Referring to the drawings, the rotary drilling apparatus there illustrated comprises, generally, a base 1, with a rotary table 2 mounted thereon. The base and table are formed to provide a raceway 3 between them to carry antifriction balls or rollers 4. The rotary table 2 is formed with a peripheral channel 5, and an annular flange 6. Both the outer vertical working face 24 of the peripheral channel 5 and the outer vertical working face 25 of the annular flange 6 are machined concentric with the axis of rotation of the table 2. The upper horizontal working face 26 of the annular flange 6 is machined normal to the axis of rotation of the table 2.

The upper surface of the base 1 is provided with an annular recess forming an annular face 7 concentric with the axis of rotation of the apparatus. A plurality of segmental hold-down thrust brackets 9 are positioned on the base diametrically opposite each other. Bolts 10 secure the hold-down thrust brackets on the base 1 against vertical displacement. Each hold-down thrust bracket 9 is formed with an inner vertical working face 18, complementary to and cooperating with the vertical face 24 of the peripheral channel 5 on the rotary table. A depending lip or flange 19 projects from the under side of said hold-down thrust brackets 9. The inner vertical wall 21 of this depending lip 19 is complementary to the vertical working face 25 of the annular flange 6 of the rotary table. The outer vertical wall 22 of this depending lip 19 is complementary to and cooperates with the annular concentric wall 7 of the recess in the base 1. Thereby, the depending lip 19 provides a centering and a lateral thrust element adapted to axially maintain the rotary table 2 on the base 1, and to translate from the rotary table 2 to the base 1 any lateral thrust or vibrations. Each thrust bracket 9 is provided with an inner horizontal surface 23 extending between the inner vertical surfaces 18 and 21, which surface 23 is normal to the axis of rotation of the apparatus, and is complementary to and cooperates with the upper working face 26 of the annular flange 6, to maintain the rotary table 2 on the base 1 against vertical displacement. Each hold-down thrust bracket 9 is provided with an outer horizontal surface 20 normal to the axis of rotation, and is adapted to cooperate with the top horizontal surface 8 of the base 1, and may be spaced therefrom by one or more shims 14. The arrangement provided by this invention enables economical and accurate machining of parts. Each of the hold-down thrust brackets 9 is preferably provided with an oil cup 15 having oil holes 27 communicating with the working faces 18, 21 and 23 of said hold-down thrust bracket 9.

In manufacture, the machining of the working and bearing surfaces of the rotary table 2, base 1 and thrust brackets 9, may be performed at one setting of each respective part, thereby assuring proper concentric alignment of the working faces.

In operation, the rotary table of a drilling apparatus provided with this invention will be maintained against vertical displacement in working relationship on the base 1 by the inner horizontal faces 23 of the opposed segmental hold-down thrust brackets contacting with the upper horizontal bearing face 26 of the annular flange 6. The lateral thrust and radial vibration induced by the rapid rotation of the table 2 and the irregular stresses of drilling operations will be translated by the depending lips 19 of the respective segmental hold-down thrust brackets 9 to the base 1. It will be appreciated that, due to the stability of the base 1, which backs up the depending lips 19 and receives the lateral thrust and radial vibrations from the rotary table, the derangement of parts had in prior rotary drilling apparatus, will be eliminated. The bolts 10 are relieved of lateral thrust, and the lateral thrust from the rotary table being translated through the lips 19 in fact insures that the hold-down thrust brackets 9 will be maintained in proper position on the base 1, thereby automatically maintaining the table 2 in axial alignment and permitting very much higher speed of rotation and more rapid drilling, and eliminating wear and destruction of parts which were occasioned by the lateral thrust and vibration set up in former devices of this character.

A further advantage of this invention is had in assembling the apparatus. The table 2 is readily and automatically axially aligned by inserting the parts one within the other, since all of the engaging faces are concentric and complementary. That the apparatus is properly assembled, readily appears when the depending lips 19 bear against the cooperating surfaces on the table 2 and within the base 1. This arrangement, therefore, eliminates the necessity of exact positioning of the hold-down thrust brackets required in former devices of this character.

Various modification in details of construction may readily appear in a rotary drilling apparatus embodying this invention and are contemplated. The scope of the invention is not limited to such variable details but is of the extent defined in the following claims.

I claim:

1. In a rotary drilling apparatus, a base, a table revolvable upon the base, a hold down thrust bracket provided with a depending lip interposed between the rotary table and the base, the lip having inner and outer faces concentric to the vertical axis of rotation and adapted to center the table and resist lateral thrust thereof.

2. In a rotary drilling apparatus, a base, a table revolvable upon the base, a hold down thrust bracket provided with a depending lip interposed between the rotary table and the base, the lip having an inner table engaging face concentric to the vertical axis of rotation.

3. In a rotary drilling apparatus, a base, a table revolvable upon the base, a plurality of segmental hold down thrust brackets each provided with a depending lip interposed between the rotary table and the base, each lip having an inner table engaging face concentric to the vertical axis of rotation and having an outer base engaging face complementary to the engaging face of the base.

4. In a rotary drilling apparatus, a table having channels provided with a horizontal extending flange, concentric faces forming the outer walls of said channel and flange, a hold down thrust bracket having concentric faces engaging said table faces and complementary thereto, and a base revolvably supporting said table and supporting said hold down thrust bracket and having vertical faces engaging and complementary to corresponding vertical faces of said hold down thrust bracket.

5. In a rotary drilling apparatus a base revolvably supporting a table, a hold thrust bracket having an integral portion thereof provided with substantially vertical faces engaging complementary faces on said table and said base.

6. A rotary drilling apparatus comprising a base, a hold down thrust bracket and a rotary table, complementary concentric substantially vertically engaging working faces on said rotary table and hold down thrust bracket, complementary substantially horizontally engaging working faces on said rotary table and said hold down thrust bracket, and complementary substantially vertically engaging faces on said hold down thrust bracket and said base.

7. In a rotary drilling apparatus, a base, a table revolvable upon the base, a hold down bracket provided with lateral thrust surfaces adapted to engage complementary surfaces on the rotary table and base to transmit the lateral thrust of the table to the base.

8. In a rotary drilling machine, a base, a table revolvable upon the base, a plurality of segmental brackets mounted upon the base and engaging the table, there being a plurality of thrust surfaces formed on the base and table and engaged by complementary surfaces formed on the brackets to resist vertical thrust of the table and transmit lateral thrust of the table to the base.

Signed at Torrance, California, this 29th day of January, 1923.

CHARLES J. McLAREN.